Oct. 23, 1934.   F. W. PARKS   1,977,970
PORTABLE STAND FOR SOUND MEASURING DEVICES
Filed April 26, 1933   2 Sheets-Sheet 1
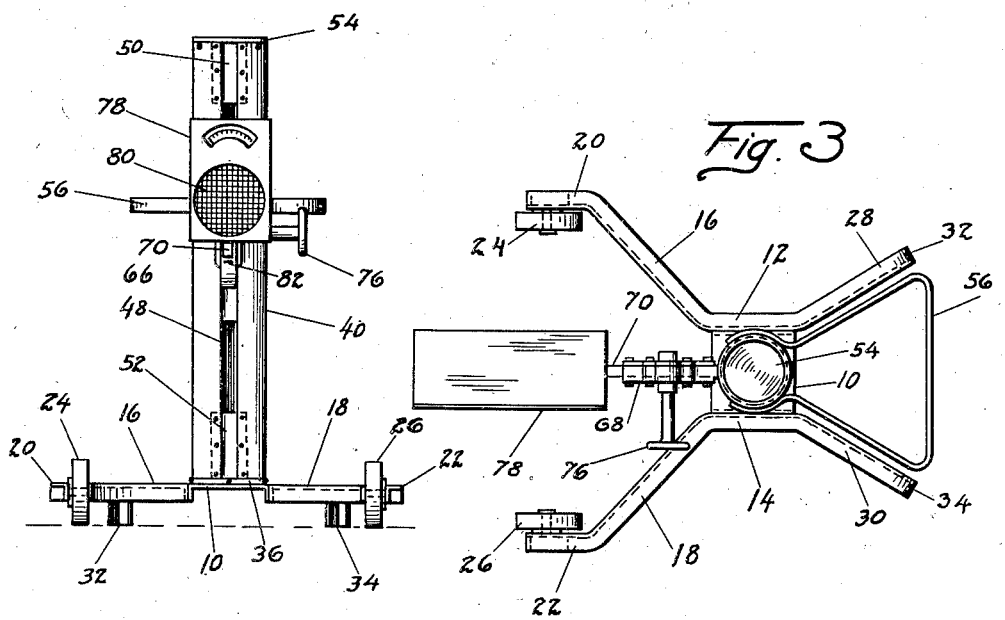
Fig. 3
Fig. 2
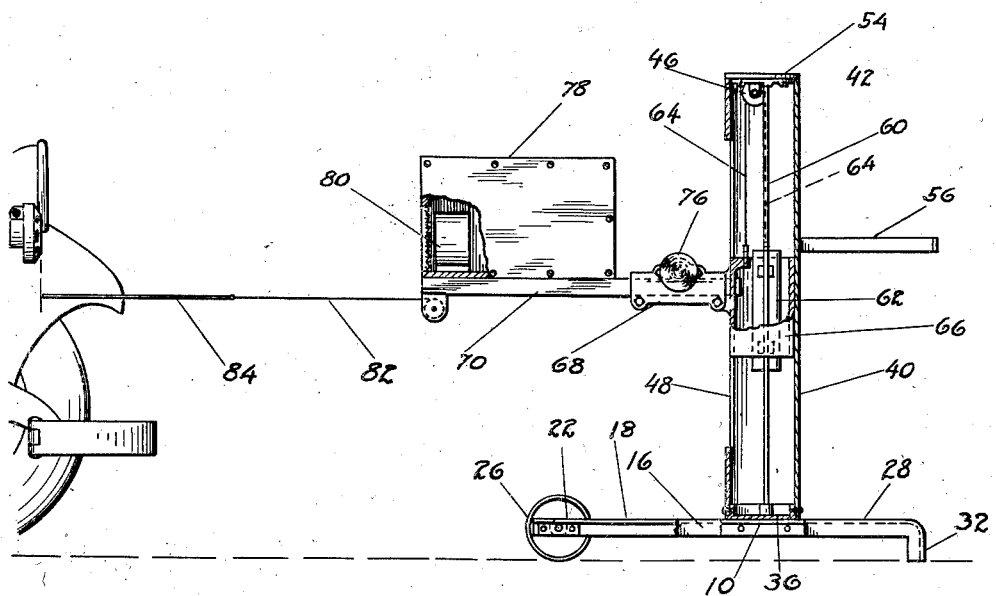
Fig. 1
INVENTOR.
FREDERICK W. PARKS
BY
ATTORNEY.

Oct. 23, 1934.     F. W. PARKS     1,977,970
PORTABLE STAND FOR SOUND MEASURING DEVICES
Filed April 26, 1933     2 Sheets-Sheet 2
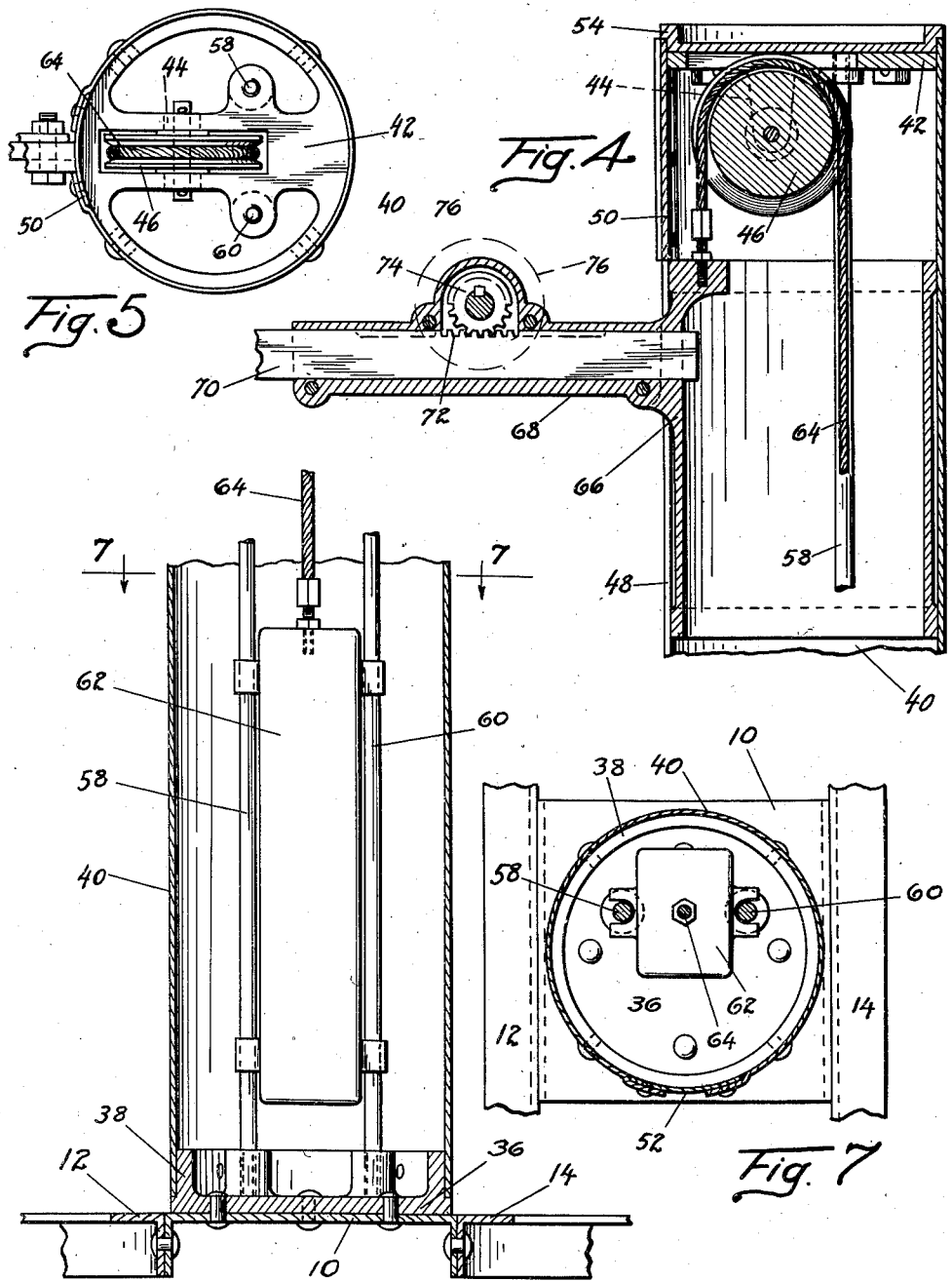
INVENTOR.
FREDERICK W. PARKS
BY O. H. Fowler
ATTORNEY.

Patented Oct. 23, 1934

1,977,970

UNITED STATES PATENT OFFICE 1,977,970

PORTABLE STAND FOR SOUND MEASURING DEVICES

Frederick W. Parks, South Bend, Ind., assignor to Bendix-Cowdrey Brake Tester, Inc., South Bend, Ind., a corporation of Delaware Application April 26, 1933, Serial No. 668,137

8 Claims. (Cl. 248—5)

This invention relates to sound measuring devices, and more particularly to stands or supports therefor.

Broadly the invention comprehends a portable stand or support for a sound measuring device. In the illustrated embodiment of the invention a cylindrical column is shown supported on a carriage having wheels so that it may be conveniently rolled about, and legs for retaining the carriage level when the stand is at rest. The column has therein a vertically movable member attached to one end of a cable, the other end of which is passed over a pulley and secured to a balance weight, so that the movable member may be easily raised or lowered and will maintain an adjusted position.

The movable member has a part projecting through an elongated slot in the column, and a sleeve is secured to the projected part. The sleeve has positioned thereon a reciprocable arm movable through the medium of a rack and pinion, and the arm supports a casing containing a sound measuring device.

Because of the structure of the carriage supporting the column and the adjustability of the arm supporting the sound measuring device, the stand may be moved relatively close to the front of a motor vehicle without interference offered by the bumper on the vehicle. This is highly desirable in instances where the horn is carried on the engine of the vehicle, or other parts remote from the front thereof.

An object of the invention is to provide a portable stand or support for a sound measuring device.

Another object of the invention is to provide a portable stand or support for a sound measuring device having vertically and laterally adjustable means for supporting the sound measuring device.

With these and other objects in view which may be incident to my improvements, the invention consists in certain parts and combinations to be hereinafter set forth and claimed, with the understanding that the several necessary elements comprising my invention may be varied in construction, proportions and arrangement, without departing from the spirit or scope of the appended claims.

In order to make the invention more clearly understood, I have shown in the accompanying drawings means for carrying the same into practical effect, without limiting the improvements in their useful application to the particular constructions which, for the purpose of explanation, have been made the subject of illustration.

In the drawings forming a part of this specification,—

Figure 1 is a side elevation partly in section illustrating the invention in use, Figure 2 is a front elevation, Figure 3 is a top plan view, Figure 4 is an enlarged vertical sectional view partly broken away, Figure 5 is a top plan view with the cover removed, Figure 6 is a vertical sectional view partly broken away, and Figure 7 is a cross-sectional view substantially on line 7—7, Figure 6.

Referring to the drawings for more specific details of the invention, 10 represents a base including a short channel section having bolted or otherwise secured to its respective flanges corresponding members 12 and 14, the ends 16 and 18 of which are bent outward and then parallel to each other as at 20 and 22, and journaled on the parallel portions are wheels or rollers 24 and 26. The other end portions designated 28 and 30 are bent outward and downward as at 32 and 34 to maintain the base in level position when the device is at rest.

The base has suitably secured thereto a casting 36 having an annular shoulder 38 on which is sleeved one end of a cylindrical column 40 suitably secured in position as by machine screws. The other end of the column has fitted therein a casting 42 having dependent bearings 44 supporting for rotation a pulley 46, the object of which will hereinafter appear.

As shown, the column has a longitudinal slot 48. Preferably, the column is slotted throughout its entire length, and the adjacent edges are secured together at the respective ends of the column as by plates 50 and 52. This is found to be the most expedient and least expensive method in the manufacture of the device. The upper end of the column is closed as by a cover plate 54, and suitably secured to the column is a handle 56.

The castings 36 and 42 are connected as by parallel rods 58 and 60 positioned within the column. These rods support for reciprocation a balance weight 62. The weight is connected to one end of a flexible member or cable 64, passed over the pulley 46, and secured to a cylindrical member 66 slidable on the inner wall of the column.

The cylindrical member 66 has a part projecting through the slot 48 in the wall of the column, and to this part is suitably secured a sleeve 68 in which is positioned for reciprocation an arm 70 provided with a rack 72 in mesh with a pinion 74 journaled on the sleeve and driven by a hand wheel 76.

The arm 70 supports a casing 78 in which is housed a sound measuring instrument 80, and depending from the end of the arm is a retractable measuring tape 82 to the end of which is attached a rod 84 so that the distance of the sound measuring instrument or device from the horn of a motor vehicle may be conveniently measured.

While I have shown and described the preferred embodiment of my invention, I wish it to be understood that I do not confine myself to the precise details of construction herein set forth by way of illustration, as it is apparent that many changes and variations may be made therein by those skilled in the art without departing from the spirit of the invention or exceeding the scope of the appended claims.

Having thus described the various features of the invention, what I claim as new and desire to secure by Letters Patent is,—

1. A portable stand for a sound measuring instrument comprising a carriage, a hollow slotted column thereon, a vertically movable member in the column having a sliding engagement with the inner wall of the column, an arm on the member extending through the slot, and means wholly within said column for counterbalancing the member.

2. A portable stand for a sound measuring instrument comprising a carriage, a hollow column thereon having an elongated slot, a cylinder slidable on the inner wall of the column, means wholly within the column for balancing the cylinder, a lateral sleeve on the cylinder extending through the slot, an arm slidable in the sleeve, means for extending and contracting the arm, and a casing on the arm.

3. A portable stand for a sound measuring instrument comprising a carriage, a hollow column thereon having a longitudinal slot, a cylinder slidable on the inner wall of the column having a sleeve extended through the slot, a balance weight atached to the cylinder and located within the hollow column, an arm slidable in the sleeve, means for moving the arm, and a casing carried by the arm.

4. A portable stand for a sound measuring instrument comprising a carriage, a hollow column thereon having a longitudinal slot, spaced guides in the column, a cap on the column, a pulley suspended from the cap within the column adjacent the upper end of the guides, a cylinder slidable in the column, a weight slidable within the column on the guides, a flexible member connecting the cylinder to the weight and adapted to travel on the pulley, a sleeve on the cylinder projecting through the slot, an arm movable in the sleeve, means for moving the arm, and a casing carried by the arm.

5. A portable stand for a sound measuring instrument comprising a carriage, a hollow column thereon having a longitudinal slot, spaced guides in the column, a pulley in the upper end of the column between the ends of the guides, a cylinder slidable on the inner wall of the column, a weight slidable within the column on the guides, a flexible member connecting the cylinder to the weight and adapted to travel on the pulley, a sleeve on the cylinder projecting through the slot in the column, an arm movable in the sleeve, a rack and pinion for moving the arm, and a casing carried by the arm adapted to house a sound measuring instrument.

6. A portable stand comprising a base, a hollow column thereon having an elongated slot, a hollow member slidable on the inner wall of the column, supporting means on the member and extending through the slot, a guide in the column extending through the hollow member, a pulley carried by the hollow column, a weight slidable on the guide and a flexible tension element connecting the hollow member to the weight and adapted to travel on the pulley.

7. A portable stand comprising a base, a hollow column thereon having an elongated slot, a hollow member slidable on the inner wall of the column, supporting means on the member and extending through the slot and means within said column including a counterweight for counterbalancing said member, said counterweight being adapted to travel through said hollow member without interfering therewith.

8. In combination, a hollow column, having an elongated slot therein, a hollow member slidable on the inner wall of the column, a support arm secured to said member and extending through said slot, guide means in said column extending through said hollow member, a counterweight in said column slidably engaging said guide and adapted to pass through said hollow member, and flexible means connecting said member and counterweight.

FREDERICK W. PARKS.